Jan. 17, 1956  R. P. RANNEY ET AL  2,731,185
CAP FASTENER
Filed Oct. 31, 1952  3 Sheets-Sheet 2
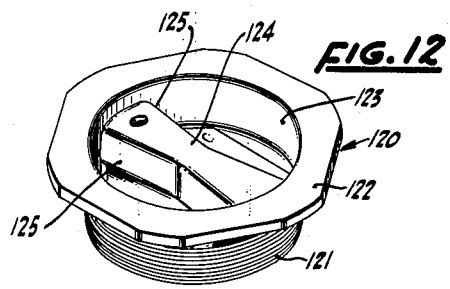
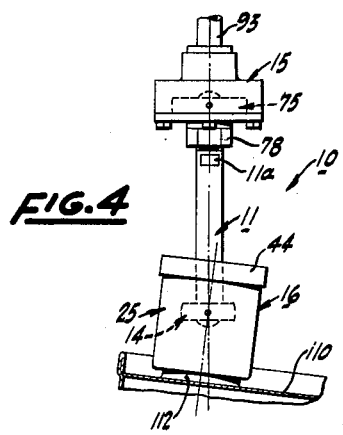
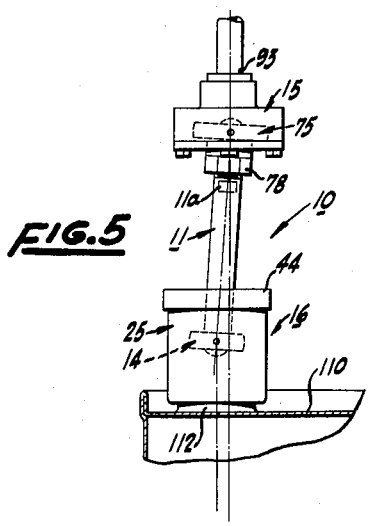
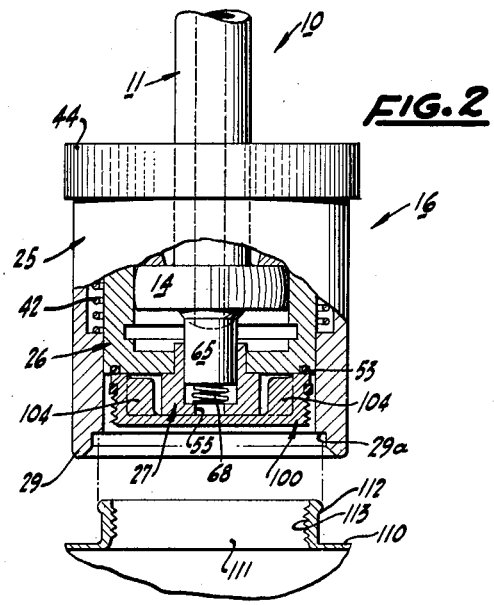
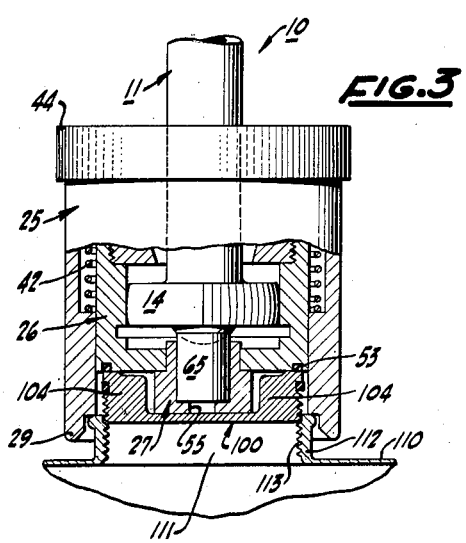
INVENTORS
RUFUS P. RANNEY
DONALD H. REESE
BY
ATTORNEY Jan. 17, 1956 R. P. RANNEY ET AL 2,731,185
CAP FASTENER
Filed Oct. 31, 1952 3 Sheets-Sheet 3
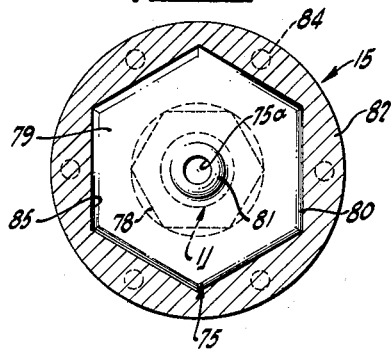
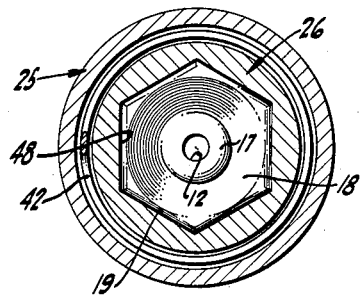
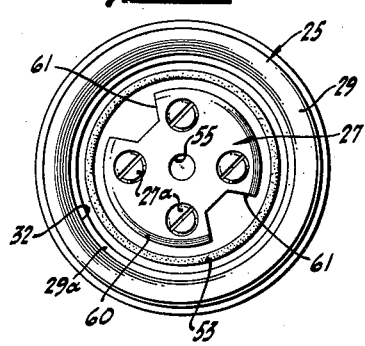
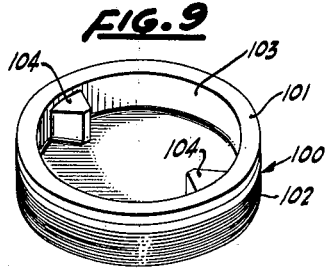
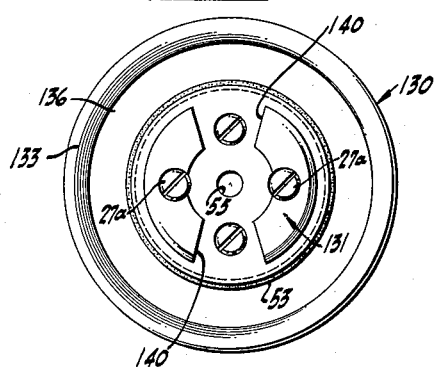
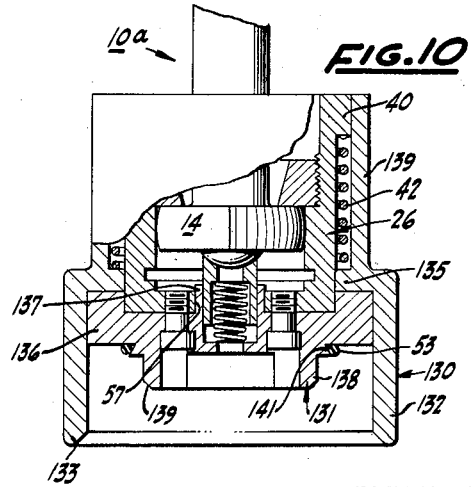
INVENTORS
RUFUS P. RANNEY
DONALD H. REESE

# United States Patent Office 2,731,185
Patented Jan. 17, 1956

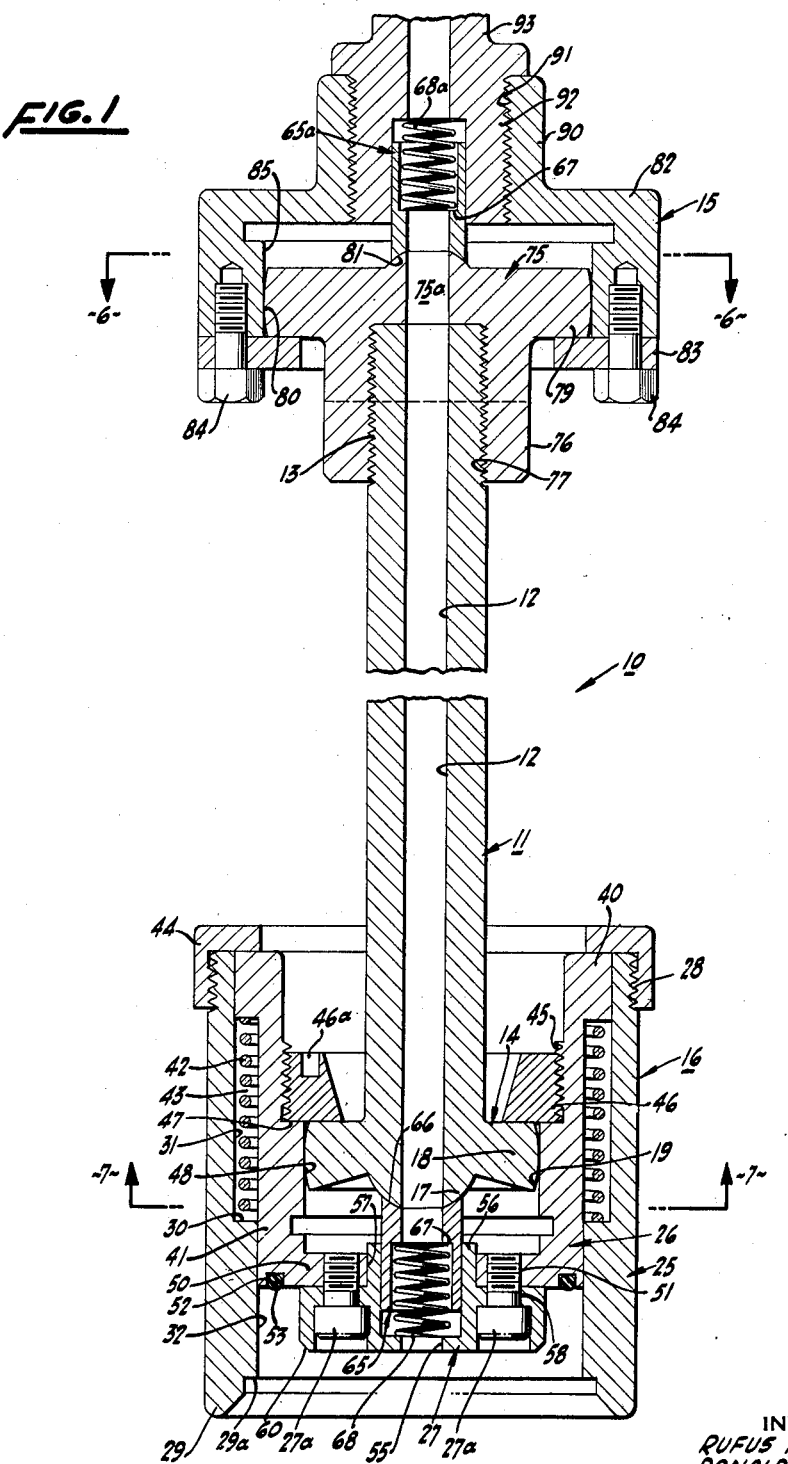

2,731,185
CAP FASTENER

Rufus P. Ranney, San Rafael, and Donald H. Reese, El Cerrito, Calif., assignors, by mesne assignments, to California Research Corporation, San Francisco, Calif., a corporation of Delaware Application October 31, 1952, Serial No. 317,856

10 Claims. (Cl. 226—88)

This invention relates to a device for inserting a threaded member, such as a screw cap, into a threaded opening, such as a bung hole, and for aligning the threaded member with such opening and screwing it into the opening.

In capping drums and barrels by automatic or semi-automatic means, a problem is presented by reason of the fact that bung holes of drums and barrels are not located in precisely the same radial position relatively to the rim or chime of the drum, and because the threaded rims of bung holes frequently deviate from a horizontal plane. Heretofore it has been the usual practice to cap drums and barrels by hand. An operator employs, for this purpose, any form of suitable wrench, such as a torque wrench, having a chuck or fitting adapted to mate with the cap or bung. There is now available certain apparatus capable of aligning drums with their bung holes in a predetermined position and then filling the drums with liquid. The filled drums are then fed forwardly from the filling station to a capping station with their bung holes in a predetermined position. In the operation of such a machine, an automatic tool for picking up and holding bungs or caps, aligning each with its bung hole and screwing it into such bung hole could be employed advantageously. Such automatic tool should, however, be adapted to compensate or adjust automatically for the deviations above noted. More particularly, an automatic tool for such purpose should be capable, automatically, of bringing the thread of the bung or cap and the thread of the bung hole into axial alignment such that rotation of the tool will thread the bung or cap into the hole.

It is an object of the present invention to provide an improved tool of the general character and for the general purpose hereinabove described.

It is another object of the invention to provide a tool for automatically aligning threaded caps, nuts and the like with companion threaded members, and to thread such caps or nuts on to or into their companion members.

Yet another object of the invention is to provide a tool for automatically aligning the caps or bungs of vessels such as drums and barrels, with the bung holes of such vessels, and to screw the caps into the bung holes.

A still further object is to provide a tool for automatically inserting caps or bungs in the bung holes of drums or barrels, such tool being capable of automatically adjusting itself for deviations and irregularities of bung holes with respect to the chime of the drum and with respect to a horizontal reference plane.

Yet another object of the invention is to provide a tool adapted to rotate a threaded bung or cap or other threaded member and which will automatically bring such bung or cap into axial alignment with a companion threaded member such as a bung hole.

Another object is to provide a tool of the character and for the purpose described having a shaft or spindle and a chuck, means for applying suction to a threaded member such as a bung or screw cap to clamp the same to the chuck and means for allowing angular movement of the chuck relatively to the spindle without breaking the suction.

These and other objects of the invention will be apparent from the ensuing description and the appended claims.

Certain forms of the invention are illustrated by way of example in the drawings, in which, Figure 1 is a longitudinal section through the device of the invention, such device being provided with a fitting for one type of cap or bung which is in general use.

Figure 2 is a fragmentary view of the device of Figure 1, showing the lower end thereof partly in elevation and partly in section. In this figure the device is shown with a cap or bung seated in the chuck and approaching a bung hole.

Figure 3 is a view similar to that of Figure 2, showing the cap seated in a bung hole and about to be screwed into the bung hole.

Figure 4 is a view in elevation showing how the device of the invention automatically adjusts itself for deviations of a bung hole from the horizontal.

Figure 5 is a view similar to that of Figure 4, showing how the device of the invention automatically adjusts itself for lateral deviations of a bung hole.

Figure 6 is a section taken along the line 6—6 of Figure 1.

Figure 7 is a section taken along the line 7—7 of Figure 1.

Figure 8 is a bottom view of the device of the invention, as seen from beneath Figure 1.

Figure 9 is a perspective view of one type of cap or bung which is in general use, and for which the end fitting or chuck shown in Figure 8 is intended.

Figure 10 is a fragmentary view, partly in section and partly in elevation, of a modification of the device of Figure 1, such modification being intended for use with another type of cap, shown in Figure 12.

Figure 11 is a bottom view showing the end fitting of the modification of Figure 10.

Figure 12 is a perspective view of the type of cap or bung for which the device of Figures 10 and 11 is intended.

Referring now to the drawings and more particularly to Figure 1, the tool of the present invention is generally designated as 10. In the form illustrated in Figure 1, it comprises a tubular shaft 11 having an axial suction passage 12 extending from end to end. The shaft 11 is threaded at its upper end at 13 and it is formed with a head 14 at its lower end. An upper coupling means 15 is provided at the upper end and a lower coupling means 16 is provided at the lower end of shaft 11. The head 14 at the lower end of the shaft is formed with a balled lower end 17 and with a flange 18. The flange 18, as shown in Figure 7, is of polygonal, in this case hexagonal shape and its outer edges are chamfered at 19 to provide curved bearing surfaces having a purpose which is described hereinafter.

The lower coupling means 16 comprises a tubular socket or casing 25 within which is disposed a sleeve 26 which is slidable within the socket 25. The coupling member 16 also comprises a fitting or cap holder 27 which is fixed to the sleeve 26 by means of countersunk cap screws 27a. The socket 25 is threaded externally at its upper end at 28 and at its lower end it is formed with a tapered and rounded edge 29 and an annular shoulder 29a. Intermediate the threaded upper end 28 and the tapered lower edge 29, the socket is formed with an annular shoulder 30 which separates the interior of the socket into an upper portion 31 of relatively large diameter and a lower portion 32 of relatively small diameter.

The sleeve 26 is a tubular member having a rim or outside flange 40 at its upper end of a diameter to fit snugly but slidably in the upper portion 31 of the socket 25. The lower end or main body 41 of the sleeve 26 fits snugly but slidably within the lower portion 32 of the socket 25. An expansion spring 42 is provided which is disposed within the annular space 43 between the socket 25 and the sleeve 26 and which is compressed between the shoulder 30 and the flange 40. A ring nut or threaded cap 44 is provided to clamp the socket 25 and the sleeve 26 in the position shown.

Inwardly of the flange 40 the sleeve 26 is threaded internally at 45 to receive a nut 46 having slots 46a formed therein to receive a tool, and it is also provided with an annular shoulder 47 for the nut 46 to bear against. Beneath the shoulder 47 the sleeve 26 is formed with a bearing surface 48 which, as shown in Figure 7, is of polygonal, in this case hexagonal shape to conform to and mate with the hexagonal flange 18 of head 14. The flange 18 and the bearing surface 48 of sleeve 26 are of such configuration as to provide a non-rotatable axial connection between the shaft 11 and the sleeve 26 (i. e., such that rotation of the shaft 11 will cause rotation of the sleeve 26), and also to provide a universal type of joint. This last mentioned feature is provided by the chamfered edges 19 of the flange 18, which are free to rotate to a limited degree on the bearing surface 48. This allows angular movement of the sleeve 26 relatively to the shaft 11, for a purpose explained hereinafter.

At its extreme lower end the sleeve 26 is formed with an inside flange 50 which is tapped at 51 for reception of the cap screws 27a. At its lower end the sleeve 26 is also formed with an annular groove 52 to receive an O-ring 53.

The cap holder 27 is a disc-like member having an axial passage 55 and a hub 56 of a diameter to snugly but slidably fit within the axial opening 57 formed by flange 50 of sleeve 26. Also, the cap holder 27 is formed with holes 58 to receive the above-mentioned cap screws 27a for clamping the cap holder to the sleeve 26. The cap holder 27 is beveled at its lower edge as shown at 60 and, as shown in Figure 8, it is cut away at 61 to provide generally V-shaped open sectors which are diametrically opposite one another and which have a purpose and function described hereinafter.

A tubular sealing member 65 is also provided which forms a part of the lower coupling 16. This sealing member is formed with a concave, balled upper end 66 of the same radius as the balled lower end 17 of the head 14 of shaft 11. Adjacent its balled end 66, the sealing member 65 is formed with an internal annular shoulder 67, and an expansion spring 68 is provided which is compressed between the shoulder 67 and the cap holder 27. The sealing member 65 is of a diameter to snugly but slidably fit within the hub 56 of cap holder 27.

The upper coupling member 15 comprises a head 75 which is generally similar to the head 14 of shaft 11 but is fabricated as a separate part. The head 75 is tubular, being formed with an axial passage 75a to provide a continuation of the axial passage 12 of shaft 11, and it is also formed with a hub 76 which is threaded internally at 77 for screwing on to threaded upper end 13 of shaft 11. As shown in Figures 4 and 5, the hub 76 is of polygonal shape at 78 to receive a wrench. The shaft 11 is also of polygonal shape at 11a, to likewise receive a wrench, thereby permitting a tight union of the head 75 and the shaft 11. Above the hub 76, the head 75 is formed with a flange 79 which is of polygonal, in this case hexagonal shape, as is most clearly shown in Figure 6. The flange 79 has its outer edges chamfered at 80 to provide curved surfaces for a purpose described hereinafter. The upper end of the head 75 is balled, as shown at 81.

A coupling socket or casing 82 is provided to which is clamped a ring 83 by means of cap screws 84. The lower end of the coupling socket 82 is formed with a bearing surface 85 which, as shown in Figure 6, is of hexagonal shape to mate with the hexagonal flange 79 of the head 75. A non-rotatable, universal-type connection between the upper head 75 and the coupling socket 82 is, therefore, provided which is similar to the connection between the lower head 14 and sleeve 26. The coupling socket 82 is formed at its upper end with a hub 90 which is threaded internally at 91 to receive the threaded end 92 of a tubular spindle or drive shaft 93. A tubular sealing member 65a is provided which is identical to the sealing member 65 at the lower end of the device, and an expansion spring 68a is also provided which is compressed between the shoulder 67 of the sealing member 65a and the lower end of the spindle or drive shaft 93.

The socket 25 and cap holder 27 illustrated in Figure 1 are intended for use with one type of cap or bung which is in general use and is known by the trademark "Tri-Sure," this being a trademark of American Flange and Manufacturing Co., Inc. of New York, N. Y. The Tri-Sure cap is illustrated in Figure 9, and, as there shown, it comprises a disc-like body 100 having an upright flange or rim 101 which is threaded externally at 102 and is intended to screw into a bung hole of a drum or barrel. The rim 101 forms a socket indicated at 103, and triangular members 104 integral with the rim extend radially inwardly and are diametrically opposite one another. These triangular members are intended to fit within notches, slots or other openings of a tool or wrench to provide a non-rotatable connection for the purpose of rotating the cap and screwing it tightly into a bung hole.

Referring now to Figures 2 to 5, inclusive, it will be seen that the tool 10 employing the type of socket illustrated at 25 and the type of cap holder illustrated at 27, operates as follows in connection with a cap such as the above-mentioned Tri-Sure cap: A drum is shown in Figures 2 and 3 at 110 having a bung hole 111 whose rim 112 is threaded internally at 113. In Figure 4 the bung hole is shown as deviating from a horizontal plane and in Figure 5 as being out of registry with the axis of the tool 10. The tool 10 is assumed to be held by suitable automatic means for rotating it and for lowering it vertically in approximate but not necessarily exact registry with the axis of the bung hole. The tool can, of course, be held in precise registry with a bung hole, but because of lateral deviations of bung holes this is impracticable. It is an important advantage of the device of the invention that deviations from the horizontal (illustrated in Figure 4) and lateral deviations (illustrated in Figure 5) are automatically compensated by the device of our invention.

Suction is applied to the cap holder 27 through the axial passage 12 by any suitable means (not shown), and a cap such as that illustrated at 100 is picked up and held by means of the cap holder 27 and by virtue of the suction applied through the passage 12. In this connection, the O-ring 53 seated in groove 52 of sleeve 26, seals against the upper edge of the rim of the cap to provide an effective seal so that suction will enable the tool to firmly hold the cap. The cap holder 27 enters the socket 103 of the cap and, inasmuch as the tool is rapidly rotating, the sectors 61 of the cap holder 27 will be brought quickly into registry with the triangular members 104 of the cap. A non-rotatable connection is thereby provided between the tool 10 and the cap 100.

It is intended that the tool 10 be lowered vertically along the axis of the spindle 93. As noted above, this will not necessarily register the cap 100 with the center of the bung hole 104, because the bung hole may (and frequently does) deviate from the horizontal and also radially with respect to the chime of the drum. It is, therefore, necessary to shift the cap in a horizontal plane to correct for radial deviation and to rotate the cap in a vertical plane to correct for deviation of the bung hole from the horizontal.

It will be noted that the lower edge 29 of the socket 25 tapers inwardly from a diameter substantially greater than the diameter of the rim of the bung hole 111, to a diameter only very slightly greater than that of such rim. As the tool 10 is lowered, this taper will accommodate normal radial deviations of the rim; i. e., deviations in a horizontal plane with respect to the chime of the drum. Thus, the tapered lower end 29 of the socket 25 will receive the rim of the bung hole notwithstanding radial deviation, and as lowering of the tool is continued the rim of the bung hole will act as a guide for the socket 25. Meanwhile, the spindle 93 continues its descent in a fixed, vertical path, and the shaft 11, socket 25, cap holder 27 and cap 100 continue to rotate, but the universal-joint connections provided by the coupling means 15 and 16 will permit the shaft 11 to assume an angular position relatively to the spindle 92 as shown in Figure 5 (hence allow for radial deviation of the bung hole) and will also permit the socket 25 to move angularly relatively to the shaft 11 as shown in Figure 4 (hence allow for deviation of the bung hole from the horizontal).

The rim of the bung hole, acting as a guide as indicated, and cooperating with the universal connections at 15 and 16, will therefore, align the bung or cap 100 axially with the bung hole 104, and continued rotation of the spindle 93 will screw the cap into the bung hole.

As the cap 100 is screwed into the bung hole 111, the shoulder 29a of socket 25 will contact the top of the rim 112, and continued downward movement of the tool to a limited but substantial extent will compress the spring 42 and cause axial shifting of the socket 25 relatively to the sleeve 26. A further feature of the tool is that, notwithstanding the angularity of the shaft 11 relatively to the driving spindle 93 and of the lower coupling 16 relatively to the shaft 11, suction is maintained at all times. This is a feature of importance, and it is provided by reason of the rotatable engagement of the sealing members 65 and 65a with the balled ends 17 and 81, respectively, of the heads 14 and 75, and by reason of the expansive force of the springs 68 and 68a.

An additional advantageous feature of the tool of the present invention resides in the fact that it is readily adapted to other types of caps. Thus, in Figure 12 there is shown another type of cap for drums or barrels. This cap, generally designated as 120, is of the type known as a "Rieke" cap, which is manufactured by the Rieke Company, Auburn, Indiana, U. S. A. As shown in Figure 12, the body of the cap 120 is threaded at 121 and it is formed with a hexagonal, horizontal flange 122. A round socket 123 is provided within which is disposed an insert 124 having diverging sides 125. The insert 124 is intended to receive a groove or slot in a wrench or other tool to provide a non-rotatable connection with such tool.

For the purpose of manipulating the type of cap shown in Figure 12, a tool of the type shown at 10a in Figures 10 and 11 is provided. The tool 10a is generally similar to the tool 10 of Figure 1, and identical parts are identically numbered. A socket 130 is employed instead of the socket 25 of Figure 1 and a cap holder 131 is employed instead of the cap holder 27 of Figure 1. The socket 130 is formed with a cylindrical body portion 132 having a tapered lower edge 133, a cylindrical hub 134 and a flange 135 at the juncture of the body 132 and hub 134. A sleeve 26 identical with the sleeve 26 illustrated in Figure 1, is slidably seated in the socket 130. As illustrated a cap holder shown at 131 has a disc-like body 136 and a hub 137 for reception in the axial hole 57 in the sleeve 26, and it is formed at its lower end with a boss 138 having a beveled edge 139. As shown in Figure 11, the boss 138 is cut away along a diameter at 140 to provide sectors which diverge and are adapted to mate with and receive the insert 124 of the cap 120. The cap holder 131 is also undercut at 141 to provide an annular groove for reception of an O-ring such as shown at 53.

Operation of the tool 10a is similar to that of the tool 10. However, as a cap 120 is screwed into a bung hole, the tapered lower edge 133 of the socket 130 bears against the top of the drum instead of the rim of the bung hole. Also the O-ring 53 seals against the interior wall of the socket 123 of the cap 120.

It will thus be apparent that a tool has been provided which is adapted to pick up and firmly hold a screw cap or the like, to automatically align such cap with a bung hole or other threaded member and to screw the cap into or onto such threaded member. This tool has a number of advantages. It is simple to manufacture, to assemble and to operate. It serves to pick up a cap or other threaded member and to rotate the same. It will assume a sufficient angularity to correct for deviations of a bung hole or the like in a horizontal plane and in a vertical plane. The tool employs two universal joints, and it also employs suction to hold a cap, and a means is provided to hold the necessary suction notwithstanding the relative angular movement of parts at the universal joints. Also, the tool is adapted to quick interchange of a minimum number of parts for adaptation to a different type of screw cap.

It will be apparent that the device of the present invention has other uses, such as unscrewing caps from bung holes, threading nuts on screws, or unthreading the same, and, in general, locating and aligning one member with reference to another.

We claim:

1. A device of the character described comprising a shaft, a chuck for holding and manipulating an object such as a screw cap, and a coupling connecting said chuck and shaft, said coupling comprising a polygonal head fixed to the shaft and a mating, polygonal member fixed to the chuck, said polygonal head having rounded edges for rolling on said mating member about a plurality of axes transverse to the axis of said shaft.

2. A device for holding and rotating a threaded object such as a screw cap, comprising a shaft having a head coaxial with the shaft, said head having a polygonal portion arranged transversely to the axis of the shaft, the outer edges of said polygonal head being rounded; a sleeve having a polygonal inner surface mating with the said polygonal head to prevent rotation of the head and shaft relatively to the sleeve but to allow angular movement of the sleeve with respect to the axis of the shaft; a socket encompassing and slidably mounted on said sleeve; means associated with said socket and sleeve for holding and rotating said threaded object; and resilient means urging said socket axially and outwardly with respect to said head.

3. A device for rotating a threaded object such as a screw cap comprising a shaft having a lower end and an axial passage for applying suction to such lower end; said device also comprising a head for the lower end of said shaft and a sleeve encompassing said head, with means connecting said head and sleeve to prevent relative rotation thereof about the axis of said shaft but to allow angular movement of the sleeve relatively to the axis of the shaft; said device also comprising a socket encompassing said sleeve, a member fixed to the lower end of the sleeve and cooperable with the socket to provide a non-rotatable connection with a threaded object and resilient means interposed between said sleeve and socket to urge the latter outwardly with respect to the sleeve.

4. A device of the character described for applying a screw cap to a threaded recess comprising a rigid shaft, a socket at one end of the shaft for holding and manipulating said screw cap, means providing a non-rotatable axial connection between said shaft and socket and means to provide pivotal movement of the socket relatively to the shaft in a plurality of radial directions; said device also comprising a driving connection at the other end of said shaft for connecting the device to a driving shaft, means mounting said driving connection on said shaft to provide a non-rotatable connection therebetween and means to provide pivotal movement of the shaft relatively to the axis of such driving shaft in a plurality of radial directions.

5. A device for seating a screw member in a threaded recess comprising a rigid shaft, a driving coupling at one end of the shaft for attachment to a driving spindle to drive said shaft, a driven coupling at the other end of said shaft, and a chuck cooperating with said driven coupling for seating said screw member each said coupling including means for providing a universal joint connection with said shaft such that axial rotation of said driving spindle will cause axial rotation of the shaft and of the chuck and will permit an effective degree of pivotal motion of said shaft relatively to said spindle and of said chuck to seat said member in a threaded recess that is misaligned with respect to said driving spindle.

6. A tool of the character described for locating a first member such as a screw cap relatively to a second member, said tool comprising a rigid shaft, a first universal joint coupling at one end thereof, a second universal joint coupling at the other end thereof, each said coupling comprising means providing a non-rotatable axial connection with said shaft but being capable of pivoting radially of the shaft, means cooperating with said first coupling for connecting the same to a drive shaft and means cooperating with said second coupling for turning said first member.

7. The tool of claim 6 wherein said shaft and couplings are formed with an axial passage for application of suction to said last-named means to hold said first member therein.

8. The tool of claim 7 wherein said member-turning means associated with said second coupling is provided with sealing means to seal against said first member.

9. A cap fastening device comprising a tubular shaft, a casing encompassing one end of said shaft and protruding beyond the shaft to provide a socket, the protruding end of said casing having a tapered guiding edge, a head fixed to said shaft within said casing and comprising a polygonal flange having rounded edges and also comprising a rounded end portion coaxial of said shaft; said device also comprising a sleeve slidable within said casing and having a polygonal portion mating with said polygonal flange to prevent relative axial rotation of the sleeve and shaft about the shaft axis but to allow rotation of the sleeve transversely of the shaft, and a spring compressed between said sleeve and casing to urge the casing outwardly; a cap holding member fixed to the outer end of said sleeve and having a passage in axial alignment with said shaft; outer sealing means associated with said sleeve for sealing against a screw cap; and inner sealing means comprising a tubular member having a rounded inner end bearing against the rounded end portion of said head, and a spring compressed between said cap holder and tubular member to urge the rounded ends of said tubular member and head into sealing, rotatable engagement.

10. A tool comprising a shaft having an axial suction passage, a radial flange and a rounded end portion, said flange having a polygonal shape and having rounded outer edges; a sleeve encompassing said flange and having a polygonal inner surface mating with said flange and rotatable on said rounded outer edges about a plurality of axes transverse to said shaft; a chuck for mating with and rotating a threaded object such as a screw cap, said chuck being non-rotatably connected to said sleeve; and sealing means comprising a tubular member having a rounded end portion mating with the end portion of said shaft and rotatable thereon, and resilient means interposed between said chuck and tubular member and urging the rounded end portion of said tubular member into sealing engagement with said shaft.

References Cited in the file of this patent

UNITED STATES PATENTS

| | | |
|---|---|---|
| 1,888,470 | Risser | Nov. 22, 1932 |
| 1,895,037 | Herndon | Jan. 24, 1933 |
| 2,042,733 | Risser | June 2, 1936 |
| 2,097,022 | Donahue | Oct. 26, 1937 |
| 2,103,988 | Le Bus | Dec. 28, 1937 |
| 2,120,272 | Williams et al. | June 14, 1938 |